M. WALKER.
DYNAMO ELECTRIC MACHINE.
APPLICATION FILED DEC. 6, 1907.
1,115,352.
Patented Oct. 27, 1914.
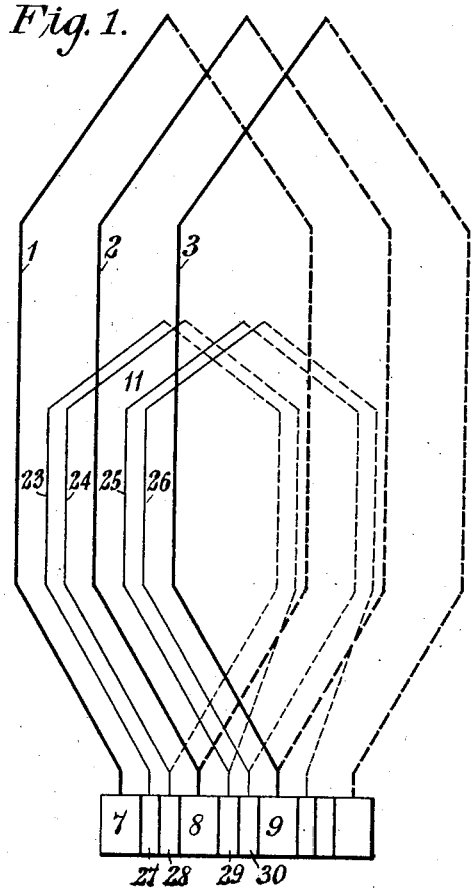
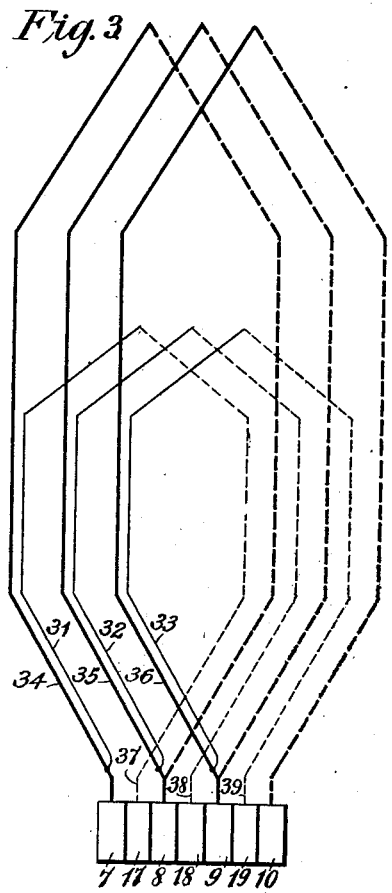
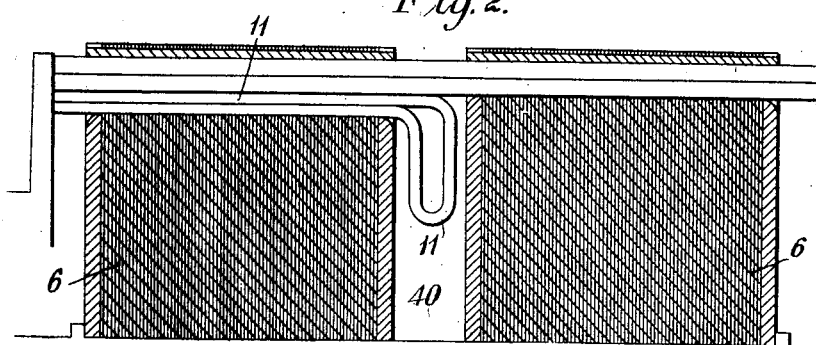
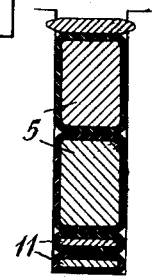
WITNESSES:
C. L. Belcher
Otto S. Schairer
INVENTOR
Miles Walker
BY
Wesley G. Carr
ATTORNEY

UNITED STATES PATENT OFFICE.

MILES WALKER, OF OLD TRAFFORD, ENGLAND, ASSIGNOR, BY MESNE ASSIGNMENTS, TO WESTINGHOUSE ELECTRIC & MANUFACTURING COMPANY, OF EAST PITTSBURGH, PENNSYLVANIA, A CORPORATION OF PENNSYLVANIA.

DYNAMO-ELECTRIC MACHINE.

1,115,352.   Specification of Letters Patent.   Patented Oct. 27, 1914.

Application filed December 6, 1907. Serial No. 405,437.

*To all whom it may concern:*

Be it known that I, MILES WALKER, a subject of the King of Great Britain, and a resident of Old Trafford, Lancester county, England, have invented a new and useful Improvement in Dynamo-Electric Machines, of which the following is a specification.

My invention relates to dynamo-electric machines having commutators and particularly to machines of this kind which are intended for operation at high speeds.

Difficulties are often encountered in connection with the commutation of the currents generated by high-speed machines on account of the comparatively large difference of potential which exists between adjacent commutator bars by reason of the comparatively small number of coils necessary to produce the electromotive force desired in the external circuit.

The present invention has for its object to provide means whereby a larger number of commutator bars may be employed with a given winding than would otherwise be possible. The desired result is accomplished by connecting the main armature coils to commutator bars separated by one or more intermediate bars and connecting the intermediate bars to points of suitable potential in an auxiliary winding disposed on the armature core.

In order that the potential difference between adjacent commutator bars may be uniform, I provide an auxiliary winding so disposed that each portion which is connected between adjacent commutator bars is subjected to a smaller amount of magnetic flux than the corresponding portion of the main winding.

In the accompanying drawings, Figure 1 is a diagram of connections for the armature winding of a dynamo-electric machine embodying my invention; Fig. 2 is a longitudinal sectional view of the armature corresponding to Fig. 1. Fig. 3 is a view corresponding to Fig. 1, but showing a winding of modified construction. Fig. 4 is a cross sectional view of a fragment of an armature showing the conductors in a single slot when the winding shown in Fig. 3 is employed.

Referring to Figs. 1 and 2, the auxiliary winding $11^a$ is of the drum type, the conductors 23, 24, 25, 26, etc., of which extend over only half the length of the armature core, a circumferential groove 40 being provided in the core to accommodate the end connections of the auxiliary winding which has double the number of turns of the main winding $5^a$ and generates the same electromotive force.

As shown in Fig. 1, there are two narrow commutator bars 27, 28 and 29, 30 between the bars 7—8 and 8—9, respectively, which are connected to the conductors 1, 2, 3 of the main winding. These pairs of intermediate bars 27—28 and 29—30 are of the same width as the bars 7, 8 and 9 and are connected to the auxiliary winding $11^a$ so that equal differences of potential exist between the bars 27—28, 28—8, 29—30 and 30—9, while the bars 27 and 29 are at the same potential as the bars 7—8, respectively. The bars of intermediate potential between the bars 7, 8 and 9 are thus the bars 28, 30 and the effect of the arrangement is such as to double the number of bars in the commutator.

A further modification is illustrated in Figs. 3 and 4, in which the adjacent bars 7—27 and 8—29, respectively, which are of the same potential, as shown in Fig. 1, are replaced by single bars 7, 8, 9, the commutator bars being made of equal width. In this arrangement, the auxiliary winding $11^b$ has the same number of turns as the main winding $5^b$, one end 31, 32, 33 of each turn being connected to the corresponding end 34, 35, 36 of a turn of the winding and the remaining end 37, 38, 39 of each turn of the auxiliary winding being connected to an intermediate commutator bar 17, 18, 19.

It will be understood that the arrangements shown in Figs. 3 and 4 may be so modified as to accommodate a greater number of intermediate commutator bars between each pair of the commutator bars connected to the main winding, by altering the number of turns in the auxiliary winding and the amount of flux to which each turn thereof is subjected and it is desired that the invention be not regarded as confined to the specific arrangements herein shown, which are given for the purpose of illustration and description and may be varied without departing from the spirit and scope of the invention.

I claim as my invention:

1. An armature for a commutator type dynamo-electric machine comprising a slotted core, main conductors located in the core slots and connected to the commutator bars which are separated by one or more intervening bars, and auxiliary conductors disposed in the main core slots for substantially one-half the lengths of said slots and having points of suitable potential connected to said intervening bars to reduce the potential difference between adjacent commutator bars.

2. An armature for commutator type dynamo-electric machines comprising a slotted core, main conductors located in the core slots and connected to commutator bars which are separated by intervening bars and auxiliary conductors disposed in the main core slots for substantially one-half of the lengths of said slots and having their respective ends connected to the main winding conductors and to the intervening commutator bars.

3. An armature for commutator type dynamo-electric machines having a main winding connected to commutator bars which are separated by intervening bars, and an auxiliary winding which is subjected to only a portion of the magnetic flux acting upon the main winding and is connected to the intervening bars.

4. An armature for commutator type dynamo-electric machines having a main winding connected to commutator bars which are separated by intervening bars and an auxiliary winding the conductors of which extend over only one-half the length of the armature core, each alternate conductor of said auxiliary winding being connected to an intervening commutator bar, and the remaining conductors of said winding being connected to conductors of the main winding.

5. An armature for commutator type dynamo-electric machines comprising a core, main coils connected to commutator bars which are separated by intervening bars, and auxiliary coils disposed in proximity to the main coils but having correspondingly located parts only one-half their lengths, each of said auxiliary coils having one end connected to a conductor of the main winding and its other end connected to an intervening commutator bar.

In testimony whereof, I have hereunto subscribed my name this eleventh day of November, 1907.

MILES WALKER.

Witnesses:
SARAH E. ASHLEY,
EVELINE WALKER.

Copies of this patent may be obtained for five cents each, by addressing the "Commissioner of Patents, Washington, D. C."